United States Patent
Thiel et al.

(10) Patent No.: US 7,306,204 B2
(45) Date of Patent: Dec. 11, 2007

(54) COLUMN COMPRISING DUAL FLOW PLATES

(75) Inventors: Joachim Thiel, Neustadt (DE); Juergen Schroeder, Ludwigshafen (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 678 days.

(21) Appl. No.: 10/494,032

(22) PCT Filed: Nov. 21, 2002

(86) PCT No.: PCT/EP02/13084

§ 371 (c)(1), (2), (4) Date: May 7, 2004

(87) PCT Pub. No.: WO03/043712

PCT Pub. Date: May 30, 2003

(65) Prior Publication Data

US 2004/0249198 A1    Dec. 9, 2004

(30) Foreign Application Priority Data

Nov. 21, 2001  (DE)  .............................. 101 56 988

(51) Int. Cl.
*B01F 3/04*  (2006.01)

(52) U.S. Cl. .................................... 261/113; 261/114.3
(58) Field of Classification Search ................ 261/147, 261/113, 114.1, 114.3, 114.5
See application file for complete search history.

(56) References Cited

U.S. PATENT DOCUMENTS

| 3,143,482 | A | * | 8/1964 | McLeod et al. | ............. | 202/234 |
| 3,765,569 | A | * | 10/1973 | Reilly | ......................... | 261/109 |
| 6,245,129 | B1 | * | 6/2001 | Yoshikawa | .................... | 95/245 |
| 6,375,921 | B1 | * | 4/2002 | Eickhoff et al. | ............. | 423/588 |

FOREIGN PATENT DOCUMENTS

| DE | 199 24 532 | 11/2000 |
| DE | 199 24 533 | 11/2000 |
| EP | 1 093 850 | 4/2001 |

* cited by examiner

*Primary Examiner*—Scott Bushey
(74) *Attorney, Agent, or Firm*—Oblon, Spivak, McClelland, Maier & Neustadt, P.C.

(57) ABSTRACT

A column for the thermal treatment of mixtures which contain one or more polymerizable compounds is proposed, which column has dual-flow trays with openings whose diameter is constant within a dual-flow tray, the dual-flow trays having openings of decreasing diameter with increasing distance from the feed of the mixture to be treated.

11 Claims, No Drawings

COLUMN COMPRISING DUAL FLOW PLATES

The present invention relates to a column having dual-flow trays and a process using the column.

In the thermal treatment of mixtures which contain one or more polymerizable compounds in a column, there is always the problem that the column and the column internals become soiled with deposits and have to be cleaned by an expensive procedure, with the result that operation has to be interrupted. Thermal treatment is understood here as meaning processes such as distillation or rectification, absorption, extraction or stripping. Mixtures which can be subjected to the thermal treatment in a column are as a rule fluid, i.e. gaseous, liquid or gaseous/liquid.

Known column internals are in particular stacked packings, dumped packings or trays.

EP-A 1 093 850 proposes a packed column for the treatment, in particular distillation of mixtures, containing polymerizable substances, such as (meth)acrylic acid, it being intended to reduce the susceptibility to soiling by designing the column packing with different opening ratios, one packing region which is adjacent to the packing support plate being designed with a larger opening ratio than the remaining packing region. However, packings have the disadvantage that they are generally more susceptible to soiling than column trays.

It is an object of the present invention to provide a tray column which can be used for the thermal treatment of mixtures containing at least one polymerizable compound, the susceptibility of said tray columns to soiling being reduced in comparison with conventional tray columns. This extends the operating time of the column, and its cost-efficiency is thus increased.

We have found that this object is achieved by a column for the thermal treatment of a mixture, having dual-flow trays with openings whose diameters are constant within a dual-flow tray.

In the present invention, the dual-flow trays have openings of decreasing diameter with increasing distance from the feed of the mixture to be treated.

We have found, surprisingly, that a considerable reduction in the susceptibility to soiling and hence a considerable extension of the operating time of tray columns could be achieved by specific design of the diameters of the openings in the dual-flow trays.

The term dual-flow tray refers in a known manner to column trays having openings to which vapor and liquid pass countercurrently.

The openings in dual-flow trays are regularly the same size within the same tray. In known columns, all dual-flow trays moreover have openings of equal size. The opening ratio is established by means of the number of openings. In a known manner, the ratio of the sum of the opening areas to the total area of the dual-flow tray is defined as the opening ratio of a dual-flow tray.

In contrast, according to the invention, the openings of the dual-flow trays within a column are designed differently, in particular in such a way that the diameter of the openings decreases with increasing distance from the feed to the column. The openings within a dual-flow tray should be of equal size.

The present invention is not limited with regard to the positioning of the feed to the column: it is just as possible to provide the feed in the middle column section or in the upper or lower column section. Preferably, the feed is provided in the middle column section.

The present invention is in principle not restricted with regard to the shape of the openings: these may have any geometric shape, for example circular, elliptical, rectangular or polygonal. The openings in the dual-flow trays are preferably circular.

The decrease in the diameter of the openings with increasing distance from the feed is preferably implemented in such a way that the ratio $d_n$ to $d_{n+1}$ assumes a value which is greater than or equal to 0.5 and less than or equal to 1, where n is the number of the dual-flow tray, counted from the feed. According to the above definition, it is thus possible in an extreme case that $d_n = d_{n+1}$, i.e. that the diameter of the opening does not change between individual successive dual-flow trays. This is advantageous in terms of manufacturing technology.

With the variation of the opening diameter, the opening ratio also preferably changes with increasing distance from the feed, in particular in such a way that it decreases with increasing diameter of the openings. A person skilled in the art can easily determine the required opening ratio according to the gas or liquid loading and opening diameter.

The diameter of the openings in the dual-flow trays is preferably from 10 to 80 mm, dual-flow trays arranged above the feed preferably having openings of from 10 to 50 mm but dual-flow trays arranged below the feed preferably having openings with diameters of from 15 to 80 mm.

The opening ratio of the dual-flow trays is from 10 to 30%.

The present invention also relates to a process for the thermal treatment of mixtures which contain one or more polymerizable compounds in a column having dual-flow trays with openings which have a constant diameter within a tray, the diameter of the openings of the dual-flow trays arranged below and/or above the feed decreasing with increasing distance from the feed.

A distillation or rectification process is preferred for the process for the thermal treatment.

The process to be discussed particularly preferably relates to a mixture containing (meth)acrolein, (meth)acrylic acid and/or one or more esters of the (meth)acrylic acid.

The invention is explained in more detail below with reference to an embodiment.

EXAMPLE

An acrylic acid-containing reaction mixture was produced by catalytic gas-phase oxidation of acrolein according to example B1 of DE-A 43 02 991 and further processed according to example 1 of DE-A 197 46 689 in an absorption column and a desorption column to give a mixture having the following composition:

| | |
|---|---|
| Acetic acid | 0.02% |
| Acrylic acid | 15.1% |
| Maleic anhydride | 0.4% |
| Diphyl | 65% |
| Dimethyl phthalate | 15.4% |
| Diacrylic acid | 1.3% |
| Phthalic anhydride | 2.4% |
| Water | 0.02% |

The mixture was separated in a rectification column into a 99.6% pure acrylic acid and a high boiler mixture comprising less than 0.5% of acrylic acid. Dual-flow trays were used as internals having separation activity. The dual-flow tray had a diameter of 3 m. The hole diameter and the opening ratio of the dual-flow trays between the bottom of the column and the feed were:

Tray 1 15 mm 18%
Tray 2 15 mm 18%
Tray 3 25 mm 16%
Tray 4 25 mm 16%
Tray 5 50 mm 14%
Tray 6 50 mm 14%

The dual-flow trays were numbered beginning from the bottom of the column.

In a comparative experiment, the hole diameter was 25 mm throughout and the opening ratio was 16% throughout.

By means of the inventive measure, it was possible to extend the on-stream time of the column by 60%.

We claim:

1. A column for the thermal treatment of a mixture, which comprises:
   dual-flow trays with openings whose diameter is constant within a dual-flow tray;
   wherein the dual-flow trays below the feed of the mixture to be treated have openings having a decreasing diameter with increasing distance from the feed of the mixture to be treated.

2. A column as claimed in claim 1, wherein the dual-flow trays above the feed of the mixture to be treated have openings having a decreasing diameter with increasing distance from the feed of the mixture to be treated.

3. A column as claimed in claim 1, wherein the openings are circular.

4. A column as claimed in claim 1, wherein the decrease in the diameter of the openings with increasing distance from the feed occurs in such a way that the ratio $d_n$ to $d_{n+1}$ assumes a value which is greater than or equal to 0.5 and less than or equal to 1, where n is the number of the dual-flow tray, counted from the feed.

5. A column as claimed in claim 1, wherein the openings have a diameter of from 10 to 80 mm above the feed of the mixture to be treated and/or a diameter of from 15 to 80 mm below said feed.

6. A column as claimed in claim 5, wherein the openings have a diameter of from 10 to 80 mm above the feed of the mixture to be treated.

7. A column as claimed in claim 1, wherein the opening ratio of the dual-flow trays decreases with increasing diameter of the openings.

8. A column as claimed in claim 1, wherein the opening ratio is from 10 to 30%.

9. A process for the thermal treatment of a mixture in a column as claimed in claim 1, wherein the mixture comprises one or more polymerizable compounds.

10. A process as claimed in claim 9, wherein the mixture to be treated comprises (meth)acrolein, (meth)acrylic acid and/or one or more esters of (meth)acrylic acid.

11. A process as claimed in claim 10, wherein the thermal treatment is a rectification.

* * * * *